3,346,578
STANNOUS FLUORIDE COMPLEXES OF 2,2'-DITHIODIPYRIDINE-1,1'-DIOXIDES
Asger F. Langlykke, Plainfield, Jack Bernstein, New Brunswick, and Anthony L. La Via, Milltown, N.J., assignors to Olin Mathieson Chemical Corporation, New York, N.Y., a corporation of Virginia
No Drawing. Filed June 30, 1965, Ser. No. 468,547
1 Claim. (Cl. 260—270)

This invention relates to new compositions of matter and their method of manufacture, and more particularly, to stannous fluoride complexes of 2,2'-dithiodipyridine-1,1'-dioxides, compositions containing the same, and the method of preparing and using such complexes and compositions.

It has been found that complexes of stannous fluoride with 2,2'-dithiodipyridine-1,1'-dioxides containing one molecule of stannous fluoride per molecule of dioxide, and especially dioxides of the formula

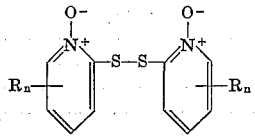

wherein R is hydrogen, lower alkyl (e.g., methyl and ethyl), halogen (e.g., bromine, chlorine and fluorine), and lower alkoxy (e.g., methoxy, ethoxy and n-hexyloxy); and $n$ is a positive integer less than four, are useful antifungal and antibacterial agents.

Thus, the complexes of this invention can be used in the prevention and treatment of fungal infections, such as enteric, topical and vaginal candida infections and dermatophytic infections, and in the treatment of bacterial infections, such as mixed infections of surface wounds, impetigo, cario-genic infections of the oral cavity for which purposes they may be administered topically or locally in suitable pharmaceutically-acceptable compositions.

Moreover, since the complexes of this invention are capable of liberating fluoride ions, they are especially well suited for the treatment and prevention of fungal and bacterial infections of the mouth, for which purposes they are most advantageously administered as an adjuvant in dentifrices. When so used, the complexes of this invention are formulated with the usual ingredients in dentifrices. Among such ingredients to prepare a paste are: non-calcium containing abrasives or polishing agents, such as insoluble sodium metaphosphate, aluminum silicate, magnesium silicate, magnesium oxide and hydroxide, and various aluminas and alumina hydrates, in levels from about 5% to about 80%, and preferably in a range of about 40% to about 60%; binders, such as acacia, tragacanth, carrageenan, sodium carboxymethylcellulose, sodium alginate or carrageenate, and petrolatum in levels from about 0.5% to about 2%, and preferably in a range of about 0.75% to about 1.5%; and humectants, such as glycerin, sorbitol solution, propylene glycol, and mixtures thereof. The sudsing or detergency of the dental formula can be obtained by adding such commonly used agents as alkyl sulfates, monoglyceride sulfonates, alkyl sulfoacetates, sarcosides and soaps in levels of about 0.01% to about 6%, preferably about 0.5% to about 2%. The stability of the fluoride complex is enhanced by the use of buffers selected to maintain a pH range from about 5 to about 7.5 and preferably between about 5.5 to about 6.5, by use of phosphate, citrate, or acetate buffers, for example, or mixtures thereof. Other suitable components of dentifrices or pastes include flavors such as oil of peppermint, spearmint or wintergreen and sweetening agents, such as saccharin, and such preservatives and coloring agents as well suggest themselves to those skilled in the art. The concentration of the complex should be sufficient to supply fluoride ions in the range of about 500 to 1,500 parts per million, and optimally about 970 to about 1,000 parts per million. This is equivalent to a concentration of about 0.5% to about 1.6% of the complex by weight, and preferably about 1% to about 1.1%.

To prepare the complexes of this invention, a 2,2'-dithiodipyridine-1,1'-dioxide (preferably of the formula given hereinbefore) is reacted with stannous fluoride. In U.S. Patent No. 3,027,372, is described the stannous chloride complex of 2,2'-dithiodipyridine-1,1'-dioxide and its method of preparation by the interaction of 2,2'-dithiodipyridine-1,1'-dioxide with stannous chloride and hydrochloric acid in an aqueous medium. If an attempt is made to prepare the stannous fluoride complexes of this invention by this method, substituting stannous fluoride for the stannous chloride, only the stannous chloride complex is obtained, and no desired stannous fluoride complex is recovered. It has been surprisingly found, however, that if in addition to the substitution of stannous fluoride for the stannous chloride, hydrofluoric acid is substituted for the hydrochloric acid, the desired stannous fluoride complex is obtainable. Therefore, according to the process of this invention, the stannous fluoride complexes are formed by interacting a 2,2'-dithiodipyridine-1,1'-dioxide with stannous fluoride and hydrofluoric acid, the reaction preferably being carried out in an aqueous medium.

As suitable 2,2'-dithiodipyridine-1,1'-dioxides may be mentioned 2,2'-dithiodipyridine-1,1'-dioxide; 2,2'-dithiodi[(lower alkyl)pyridine]-1,1'-dioxides, such as 2,2'-dithiodi(4-methylpyridine)-1,1'-dioxide,
2,2'-dithiodi(3-ethylpyridine)-1,1'-dioxide,
2,2'-dithiodi(4,6-dimethylpyridine)-1,1'-dioxide,
2,2'-dithiodi(4-n-hexylpyridine)-1,1'-dioxide, and
2,2'-dithiodi(3,4,5-trimethylpyridine)-1,1'-dioxide;
2,2'-dithiodi(halopyridine)-1,1'-dioxides, such as
2,2'-dithiodi(4-chloropyridine)-1,1'-dioxide,
2,2'-dithiodi(3,4-dichloropyridine)-1,1'-dioxide,
2,2'-dithiodi(5-bromopyridine)-1,1'-dioxide,
2,2'-dithiodi(4,5,6-trifluoropyridine)-1,1'-dioxide;
2,2'-dithiodi[(lower alkoxy)pyridine]-1,1-dioxides, such as 2,2'-dithiodi(3-ethoxypyridine)-1,1-dioxide.

These 2,2'-dithiodipyridine-1,1-dioxides may be prepared from the corresponding 2-thiopyridine-1-oxides by oxidation with a mild oxidizing agent such as aqueous hydrogen peroxide as described in U.S. Patent No. 2,742,476.

When used as a topical antifungal of antibacterial agent the complexes of this invention are formulated in the usual topically acceptable compositions, such as ointments, lotions, creams, dusting powders, aerosols and gels, the concentration of the complex preferably being about 0.5% to about 1.7% by weight of the total weight of the formulation, and optimally about 0.75% to about 1.25%. When used as a systemic antifungal or antibacterial agent, the complexes are formulated in the usual perorally acceptable compositions, such as tablets, capsules, powders, elixirs and syrups, the concentration of the complex preferably being about 1% to about 50% by weight of the total weight of the formulation. The complexes of this invention may be used to treat any animal, but preferably are used on warm blooded animals, such as domestic animals.

The following examples illustrate the invention (all temperatures being in centigrade):

EXAMPLE 1

*Preparation of 2,2'-dithiodipyridine, 1,1'-dioxide, stannous fluoride complex*

To a solution of 2.52 grams of 2,2'-dithiodipyridine, 1,1'-dioxide in 250 ml. of water and 15 ml. of concentrated hydrofluoric acid (48%), there is added slowly, with vigorous stirring, a solution of 1.57 grams of stannous fluoride in 50 ml. of water and 10 ml. of concentrated hydrofluoric acid (48%). A white precipitate formed rapidly. The mixture is stirred for one hour and is then filtered. The solid is washed with water, ethanol and ether and then dried under reduced pressure at 56° C. The dried solid weighs about 3.2 grams and melts at about 275–276° with dec.

*Analysis.*—Calcd. for $C_{10}H_8F_2N_2O_2S_2Sn$: N, 6.85; S, 15.67. Found: N, 6.93; S, 15.44.

EXAMPLE 2

To a solution of 12.6 g. (0.05 M) of 2,2'-dithiodipyridine, 1,1'-dioxide in 1,800 cc. of water is added a solution of 7.8 g. (0.05 M) of stannous fluoride in 200 cc. of water plus 5 cc. of concentrated hydrofluoric acid. A solid mass forms immediately, then appears to redissolve and reprecipitate quickly. The mixture is stirred at room temperature for one-half hour; filtered, washed with water, alcohol, ether and air-dried. The material is then dried at 1 mm. over acetone overnight to yield about 19.5 g. (95%) of product melting at about 275–276° with dec.

*Analysis.*—Calcd. for $C_{10}H_8N_2O_2S_2 \cdot SnF_2$: N, 6.85, S, 15.67. Found: N, 6.59; S, 15.83.

EXAMPLE 3

*Preparation of 2,2'-dithiodi(4-methylpyridine), 1,1'-dioxide stannous fluoride complex*

Following the procedure of Example 2, but substituting 0.05 M. of 2.2'-dithiodi(4-methylpyridine), 1,1'-dioxide for the 2,2'-dithiodipyridine, 1,1'-dioxide, the stannous fluoride complex of 2,2'-dithiodi(4-methylpyridine)-1,1'-diooxide is obtained.

Similarly, if 0.05 M of any of the following dioxides is substituted for the 2,2'-dithiodipyridine, 1,1'-dioxide in the procedure of Example 2, the corresponding stannous fluoride complexes are obtained:

2,2'-dithiodi(4,6-dimethylpyridine), 1,1'-dioxide;
2,2'-dithiodi(3-ethyl-6-methylpyridine), 1,1'-dioxide;
2,2'-dithiodi(3-methylpyridine), 1,1'-dioxide;
2,2'-dithiodi(5-methylpyridine), 1,1'-dioxide;
2,2'-dithiodi(6-methylpyridine), 1,1'-dioxide;
2,2'-dithiodi(5-bromopyridine), 1,1'-dioxide;
2,2'-dithiodi(3-ethoxypyridine), 1,1'-dioxide.

EXAMPLE 4

*Preparation of dentifrices*

To prepare a paste dentifrice containing the stannous fluoride complex of 2,2'-dithiodipyridine, 1,1'-dioxide, the following ingredients are compounded in the usual manner:

| | Gm. |
|---|---|
| The stannous fluoride complex of 2,2'-dithiodipyridine, 1,1'-dioxide | 1.063 |
| Insoluble sodium metaphosphate | 38.0 |
| Anhydrous aluminum silicate | 10.0 |
| Sodium lauryl sulfate | 0.5 |
| Sorbitol solution | 15.0 |
| Glycerin | 12.0 |
| Sodium saccharin | 0.1 |
| Carrageenan | 1.0 |
| Disodium phosphate | 0.5 |
| Methylparahydroxybenzoate | 0.1 |
| Mineral oil | 1.0 |
| Peppermint oil | 1.0 |
| Distilled water to make | 100 |

EXAMPLE 5

To prepare a powdered dentifrice containing the stannous fluoride complex at 2,2'-dithiodipyridine, 1,1'-dioxide, the following ingredients are compounded in the usual manner:

| | Gm. |
|---|---|
| Stannous fluoride complex of 2,2'-dithiodipyridine, 1,1'-dioxide | 1.063 |
| Insoluble sodium metaphosphate | 72.0 |
| Anhydrous aluminum silicate | 20.0 |
| Magnesium silicate (synthetic) | 2.0 |
| Sodium lauryl sulfate | 1.0 |
| Carrageenan | 1.0 |
| Sodium saccharin | 0.1 |
| Methylparahydroxybenzoate | 0.1 |
| Titanium dioxide | 0.25 |
| Mineral oil | 1.59 |
| Peppermint oil | 1.0 |

EXAMPLE 6

*Preparation of a lotion*

To prepare a lotion containing the stannous fluoride complex of 2,2'-dithiodipyridine, 1,1'-dioxide, the following ingredients are compounded in the usual manner:

| | Gm. |
|---|---|
| The stannous fluoride complex of 2,2'-dithiodipyridine, 1,1'-dioxide | 1.0 |
| Propylene glycol | 7.5 |
| Titanium dioxide | 0.2 |
| Cetyl alcohol | 3.0 |
| Stearyl alcohol | 0.2 |
| Tween 20 | 2.2 |
| Methylparahydroxybenzoate | 0.2 |
| Propylparahydroxybenzoate | 0.02 |
| Distilled water to make | 100 |

EXAMPLE 7

*Preparation of tablets*

To prepare 100 tablets, each containing 10 mg of the stannous fluoride complex of 2,2'-dithiodipyridine, 1,1'-dioxide, the following ingredients are compounded in the usual manner:

| | Gm. |
|---|---|
| The stannous fluoride complex of 2,2'-dithiodipyridine, 1,1'-dioxide | 1.0 |
| Microcrystalline cellulose (Avicel) | 7.9 |
| Magnesium stearate | 0.075 |
| Corn starch | 0.75 |
| Anhydrous milk sugar, U.S.P. | 5.275 |

EXAMPLE 8

*Preparation of capsules*

To prepare 100 two-piece gelatin capsules, each containing 10 mg. of the stannous fluoride complex of 2,2'-dithiodipyridine, 1,1'-dioxide, the following ingredients are mixed and encapsulated in a 100 two-piece gelatin capsules:

| | Gm. |
|---|---|
| The stannous fluoride complex of 2,2'-dithiodipyridine, 1,1'-dioxide | 1.0 |
| Magnesium stearate | 0.25 |
| Milk sugar, U.S.P. | 23.75 |

The invention may be otherwise embodied within the scope of the appended claim.

What is claimed is:

The stannous fluoride complex of 2,2'-dithiodipyridine, 1,1'-dioxide.

References Cited

UNITED STATES PATENTS

| 2,219,847 | 10/1940 | Purdum | 167—33 |
| 2,429,096 | 10/1947 | Ladd | 167—33 |
| 2,544,904 | 3/1951 | Steiger | 260—270 |
| 3,027,372 | 3/1962 | Starrs | 260—270 |

NICHOLAS S. RIZZO, *Primary Examiner.*

D. DAUS, *Assistant Examiner.*